United States Patent [19]

Allcock et al.

[11] Patent Number: 5,414,025
[45] Date of Patent: May 9, 1995

[54] METHOD OF CROSSLINKING OF SOLID STATE BATTERY ELECTROLYTES BY ULTRAVIOLET RADIATION

[75] Inventors: Harry R. Allcock; Constance J. Nelson; William D. Coggio, all of State College, Pa.

[73] Assignee: The Penn State Research Foundation, University Park, Pa.

[21] Appl. No.: 954,444

[22] Filed: Sep. 30, 1992

[51] Int. Cl.$^6$ .................. C08G 73/06; C08G 79/02
[52] U.S. Cl. .......................... 522/46; 522/83; 522/166; 522/171; 522/162
[58] Field of Search .............. 522/150, 171, 46, 111, 522/149, 83, 166, 171, 162

[56] References Cited

U.S. PATENT DOCUMENTS

| | | | |
|---|---|---|---|
| 3,429,794 | 2/1969 | Patterson | 522/150 |
| 3,711,389 | 1/1973 | Hook et al. | 522/157 |
| 4,116,785 | 9/1978 | Cheng | 522/162 |
| 4,556,614 | 12/1985 | Le Méhauté et al. | 522/166 |
| 4,578,326 | 3/1986 | Armand et al. | 429/192 |
| 4,758,483 | 7/1988 | Armand et al. | 429/192 |
| 4,840,856 | 6/1989 | Nakacho et al. | 522/162 |
| 5,009,970 | 4/1991 | Kronfli et al. | 522/166 |

OTHER PUBLICATIONS

C. J. Nelson, et al., Chemistry of Materials, 3: 786–787 (1991).
J. L. Bennett, et al., Chemistry of Materials, 1: 14–16 (1989).
D. F. Shriver, et al., C & E News, 63: 42–57 (1985).
K. M. Abraham, et al., Chem. Mater., 3: 339–348 (1991).
H. R. Allcock, et al., Biomaterials, 9: 509–513 (1988).
J. S. Tonge, et al., J. Electrochem. Soc., 134: 269–270 (1987).
P. M. Blonsky, et al., J. Am. Chem. Soc. 106: 6854–6855 (1984).
H. R. Allcock, et al., Macromolecules, 19: 1508–1512 (1986).
K. Allmer, et al., J. of Polm. Sci., 27: 1641–1652 (1989).

*Primary Examiner*—Susan W. Berman
*Attorney, Agent, or Firm*—Thomas J. Monahan

[57] ABSTRACT

A method for the crosslinking of polymeric electrolytes is presented. The method achieves crosslinking by means of ultraviolet radiation. The resulting crosslinked polymers are stable and useful as solid state battery electrolytes.

11 Claims, No Drawings

METHOD OF CROSSLINKING OF SOLID STATE BATTERY ELECTROLYTES BY ULTRAVIOLET RADIATION

GOVERNMENT SPONSORSHIP

This invention was made with Government support under Contract Number AFOSR-89-0234 awarded by the United States Department of the Air Force. The Government has certain rights in this invention.

BACKGROUND OF THE INVENTION

The present invention relates generally to the field of organic chemistry and more specifically to a method for the crosslinking of polymers, particularly to the cross-linking of polymers used in ionically conducting solids. These materials have applications in solid-state electrochemical devices (Shriver, D. F., et al., *Chem. Eng. News* 1985, 63(20), 42). Polymer-based complexes possess several advantages over semicristalline solids, and these advantages include ease of chemical modification and processability.

By way of background, lead-acid batteries suffer certain limitations in that they are far too heavy to be used as the primary energy storage device for many kinds of applications (i.e., for electrically powered vehicles). A number of high-energy-density alternate battery systems are known that would circumvent the problem of weight while having the same energy storage capacity.

NiCad (nickel-cadmium) batteries have superior battery characteristics for a very large number of applications. However, several disadvantages, including the adverse environmental effects of cachnium, initiated a search for more convenient solutions.

Liquid-electrolyte lithium batteries generally operate well in small scale applications but their disadvantages prevent them from becoming widely used. The disadvantages stem primarily from the steep vapor pressure-temperature curve for the solvent which causes the battery to leak electrolyte. Additional problems caused by formation of conductive dendrites (whiskers) which short the plates make the batteries prone to explosion due to high current flow and increased vapor pressure of the solvent. In spite of the disadvantages, lithium batteries have many clear advantages. It has been recognized that most of the problems with the liquid electrolyte type batteries could be overcome by developing a solid electrolyte lithium battery. A solid electrolyte lithium battery could eliminate the problems associated with high vapor pressure.

As a consequence intense research has been underway to find a solid electrolyte that would eliminate both the problems of explosions and dendrite growth and the subsequent shorting of the charge-discharge cycling. Most of the technical activity to date has centered on variants in the general class of polyethylene oxide (PEO)/lithium and polypropylene oxide(PPO)/lithium batteries. The major problem with those batteries has been the low conductivity of the solid electrolyte. The consequence is that a low conductivity limits a battery to low power densities. The way to get around this problem is to increase the conductivity of the solid electrolyte.

It has been shown that the polyorganophosphazenes like the high polymer poly[bis(2-(2-methoxyethoxy)ethoxy)phosphazene](MEEP)

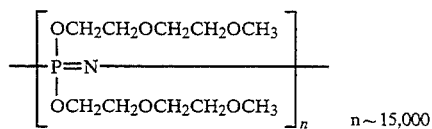

possess an ambient temperature ionic conductivity 2–3 orders of magnitude higher than poly(ethylene oxide), when each system is complexed with $LiCF_3SO_3$ (Bennett, J. L., et al., *Chem. Mater.* 1989, 1, 14) or $LiAlCl_4$ (Abraham, K. M., et al., *Chem. Mater.* 1991, 3, 339). However, a problem associated with the practical application of this polymer is its tendency to flow under light pressure. MEEP is a gelatinous substance that has been shown not to have adequate dimensional stability for use in a battery. Crosslinking is a well documented method for increasing structural integrity. As a consequence several methods of crosslinking MEEP have been developed. Previous studies have demonstrated that cross-linking of MEEP provides increased dimensional stability without reducing the ionic conductivity (Bennett, J. L., et al., *Chem. Mater.* 1989, 1, 14; Tonge J. S., et al., *J. Electrochem. Soc.* 1987, 134, 269). Prior methods for crosslinking of MEEP include chemical methods (Tonge J. S., et al., *J. Electrochem. Soc.* 1987, 134, 269) and radiation from the cobalt-60 source (Allcock, H. R., et al., *Biomaterials* 1988, 9, 509). Chemical crosslinking has that disadvantage of introducing impurities which might influence the conductivity. Chemical crosslinking requires the incorporation of a difunctional reagents, for example poly(ethylene glycol). Radiation crosslinking involves side-group coupling reactions. Moreover, the ability to crosslink the system with the salt already present allows much greater control over the materials properties and the shape of devices that employ the system. Although the gamma-radiation crosslinking method provides increased dimensional stability without reducing ionic conductivity, it is less appealing due to the fact of high cost of the source and elaborate precautions and accompanying expenses required with radioactive materials. The present invention overcomes some of the above-described disadvantages inherent with various solid electrolyte compositions and methods of the art. The invention presents methodology which permits rapid and convenient crosslinking of solid state battery electrolytes.

The present invention provides a method for crosslinking of the poly(organophosphazene) of the following formula:

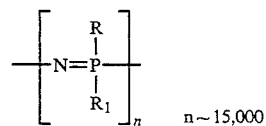

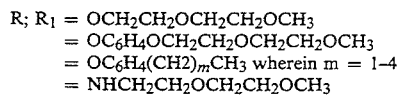

MEEP and other polymeric electrolytes by exposing the polymer to ultraviolet radiation. The UV source can be nothing more than a simple sun-tanning bulb.

SUMMARY OF THE INVENTION

In accordance with the present invention, a method for the crosslinking of polymeric electrolytes by UV radiation is presented. According to the invention the crosslinking is achieved by exposing films of polymers to ultraviolet radiation. The products are polyelectrolyte films of stable dimensions for use as solid state battery electrolytes.

OBJECTS OF THE INVENTION

An object of the invention is to develop a method for increasing the structural integrity of ionically conducting polyorganophosphazenes, including MEEP, to facilitate usage as solid electrolytes.

It is also an object of this invention to develop a non-chemical method for the crosslinking of MEEP and other polyorganophosphazenes.

Advantages of the present invention over the prior art and a better understanding of the invention and its use will become more apparent from the following disclosure wherein are set forth certain embodiments of the invention.

DETAILED DESCRIPTION OF THE INVENTION

Crosslinking of MEEP

MEEP was prepared via a 3 step procedure (Blonsky, P. M., et al., *J. Am. Chem. Soc.* 1984, 106, 6854; Allcock, H. R., et al., *Macromolecules* 1986, 19, 1508). The first step involved synthesis of poly(dichlorophosphazene) via a ting opening metathesis polymerization of hexachlorocyclotfiphosphazene; secondly, 2-(2-methoxyethoxy)ethoxide) was prepared by reaction of 2-(2-methoxyethoxy)ethanol with sodium; finally, MEEP was prepared by reaction of poly(dichlorophosphazene) with 2-(2-methoxyethoxy)ethoxide.

In a typical crosslinking reaction the polymer MEEP was dissolved in a solvent (see Scheme 1) then solution-cast as a film on glass, and the solvent was allowed to evaporate. The polymer-coated glass plate was then placed in a quartz reaction tube and purged with argon for one minute, sealed and irradiated for 20 min with a 450 W Hg lamp. A Conrad-Hanovia medium-pressure, quartz, mercury-vapor lamp equipped with a water-cooled quartz immersion well was utilized. The typical emitted ultraviolet radiation for this system is between 220 and 400 nm. The samples were irradiated in quartz reaction tubes which were placed in a rotating carousel at an approximate distance of 7 cm from the unfiltered source. The crosslinked film was then purified by extraction of the swollen gels in tetrahydrofuran. The degree of crosslinking was qualitatively determined by the appearance of the film after solvent purification. The highly crosslinked polymer films display a lesser degree of swelling.

Scheme 1

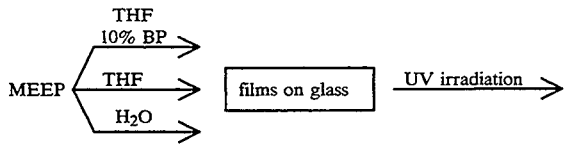

-continued
Scheme 1

Crosslinked films

Several modifications involving different solvents and additional reagents were performed.

Having generally described the invention a more complete understanding can be obtained by reference to the following specific examples which are included for the purpose of illustration only and not intended to be limitative thereof.

Example 1

The reaction for crosslinking MEEP was performed as described above. Tetrahydrofuran (THF) was used as the solvent. The crosslinked polymer displayed extensive swelling indicating a lower degree of crosslinking.

Example 2

The reaction was performed as described in Example 1, but 10 mol % benzophenone was added to the solvent as the photoinitiator (Allmer, K., et al., *J. Polym. Sci.* 1989, 27, 1641 ). The crosslinked polymer displayed a small degree of swelling indicating a higher degree of crosslinking than that in Example 1.

Example 3

The reaction was performed as in the general description. Water was used as the solvent. The polymer was lightly crosslinked as indicated by its swelling behavior.

Example 4

The reaction was performed as in Example 3 with the exception that the film was cast in the absence of oxygen (in an argon atmosphere) in order to assess the role of UV-formed oxygen radicals in the crosslinking reaction. The film appearance suggested a lower degree of crosslinking than observed in Example 3.

Example 5

The reaction was performed as in Example 4 with the exception that deoxygenated chloroform was used as a solvent. The film was cast in an atmosphere of argon. Prior to the crosslinking an additional step was included in the procedure. The solution cast film was placed under vacuum (0.01 mm Hg) for 3 days in order to remove traces of solvent and oxygen. After the UV exposure of the film a low degree of crosslinking was detected.

Additional experiments not described herein were performed to probe the role of oxygen radicals in the crosslinking reaction. These experiments suggest that the presence of oxygen improves the degree of crosslinking. The degree of crosslinking was found qualitatively to be greater for a given exposure time when benzophenone was utilized, however ultraviolet crosslinking of MEEP was possible even in the absence of a photoinitiator. A crosslinking process that does not involve the addition of a photoinitiator has obvious advantages of the system is to be used for purposes requiring high conductivity. The reaction seems to be independent of the type of solvent used.

Irradiation of MEEP induces side-group coupling reactions to form a stable, crosslinked polymer matrix. The effect of crosslinking was further evidenced in the $^1$H and $^{13}$C NMR spectra (data not shown, see Nelson, C. J., et al., *Materials* 1991, 3,786-787).

Crosslinking of PEO

Prior art proposals for crosslinking of PEO and its co-polymers involve chemical methods using isocyanates and divalent metals (U.S. Pat. Nos. 4,478,325 and 4,758,483).

Due to the similarity of the substituents in MEEP to the backbone structure of poly(ethylene oxide) PEO, films of the latter were also crosslinked by the described method.

PEO was purchased from Aldrich and used as received without additional purification.

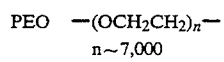
n~7,000

The general procedure of crosslinking involves the same steps as in the case of crosslinking of MEEP. Both water and chloroform were used as solvents as well as tetrahydrofuran. Benzophenone in quantity of 10 mol % was used as photoinitiator in cases where the polymer was dissolved in organic solvents. Deoxygenation of chloroform was performed in order to study the role of oxygen in the reaction of crosslinking. Films were cast in the oxygen atmosphere as well as under argon. The swelling behavior indicated the degree of crosslinking. Higher crosslinking is indicated by a lower degree of swelling.

The PEO undergoes crosslinking both in the presence and absence of benzophenone.

The described above method has been successfully applied in polymers where saturated alkyl groups participate in formation of the network of bonds necessary to introduce crosslinking. Those groups provide sites for crosslinking. A probable mechanism for crosslinking involves photolytic cleavage of C—H bonds followed by carbon radical recombination.

Thus is described the invention and the manner and process of making and using it in such clear, concise, and exact terms so as to enable any person skilled in the art to which it pertains, or with which it is most nearly connected, to make and use the same.

What is claimed is:

1. A method for crosslinking a crosslinkable material that consists essentially of a polyorganophosphazene which contains an alkyl C—H bond, comprising:
    exposing the material to a sufficient amount of ultraviolet radiation to induce crosslinking of the polyorganophosphazene.

2. The method according to claim 1 wherein the exposure takes place in the presence of a photoinitiator.

3. A method according to claim 2 wherein the photoinitiator is benzophenone.

4. The method of claim 1, wherein the polyphosphazene has a formula

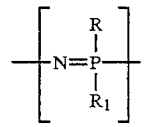

wherein R and $R_1$ can be the same or different and are selected from the group consisting of —OCH$_2$CH$_2$OCH$_2$CH$_2$CH$_3$, —OC$_6$H$_4$OCH$_2$CH$_2$OCH$_2$CH$_2$OCH$_3$, —C$_6$H$_4$(CH$_2$)$_m$CH$_3$, wherein m=1 to 4, and —NHCH$_2$CH$_2$OCH$_2$CH$_2$OCH$_3$.

5. The method of claim 1, wherein the polyphosphazene is poly[bis(2-(2-methoxyethoxy)ethoxy)phosphazene].

6. A method for crosslinking a crosslinkable material that consists essentially of an electrolyte and a polyorganophosphazene which contains an alkyl C—H bond, comprising:
    exposing the material to a sufficient amount of ultraviolet radiation to induce crosslinking of the polyorganophosphazene.

7. The method of claim 6, wherein the electrolyte is a lithium salt.

8. The method of claim 6, wherein the polyphosphazene has a formula

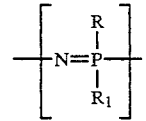

wherein R and $R_1$ can be the same or different and are selected from the group consisting of —OCH$_2$CH$_2$OCH$_2$CH$_2$CH$_3$, —OC$_6$H$_4$OCH$_2$CH$_2$OCH$_2$CH$_2$OCH$_3$, —C$_6$H$_4$(CH$_2$)$_m$CH$_3$, wherein m=1 to 4, and —NHCH$_2$CH$_2$OCH$_2$CH$_2$OCH$_3$.

9. The method of claim 6, wherein the polyphosphazene is poly[bis(2-(2-methoxyethoxy)polyphosphazene].

10. The method according to claim 6 wherein the exposure takes place in the presence of a photoinitiator.

11. The method according to claim 10 wherein the photoinitiator is benzophenone.

* * * * *